No. 637,969. Patented Nov. 28, 1899.
W. A. NORDYKE.
EXTENSION BRACKET.
(Application filed Oct. 26, 1898.)
(No Model.) 2 Sheets—Sheet 1.
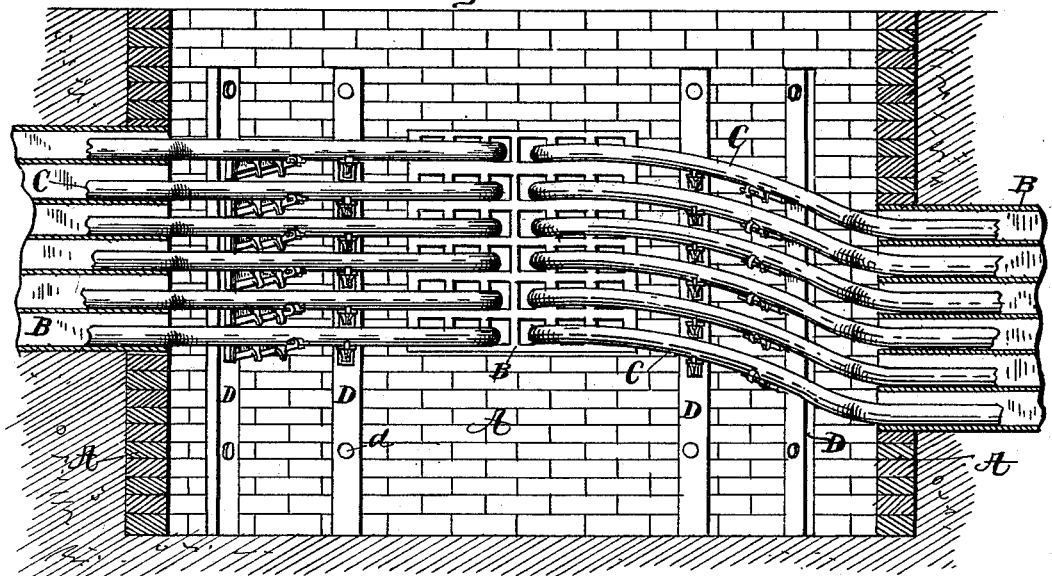
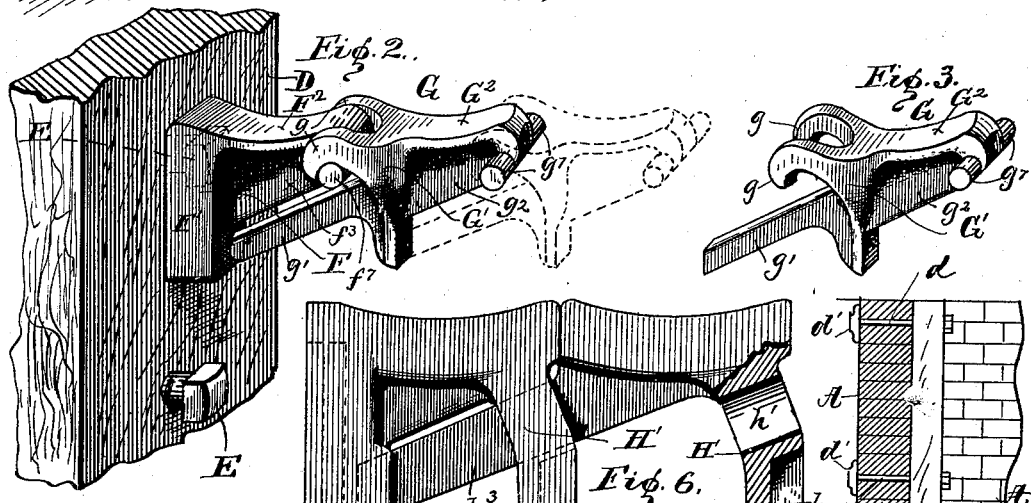
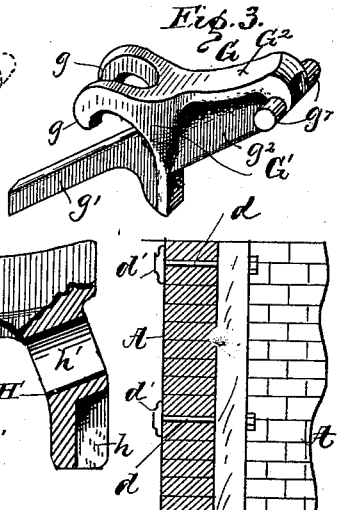
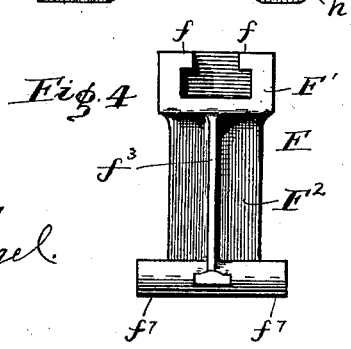
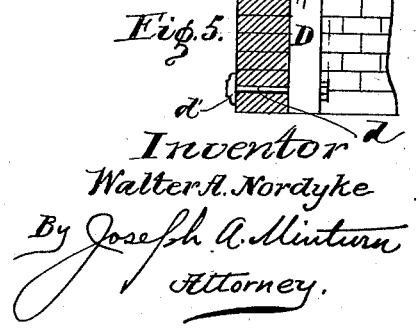
Witnesses,
Carl Schlegel.
L. A. Minturn.
Inventor
Walter A. Nordyke
By Joseph A. Minturn
Attorney.

No. 637,969. Patented Nov. 28, 1899.
W. A. NORDYKE.
EXTENSION BRACKET.
(Application filed Oct. 26, 1898.)

(No Model.) 2 Sheets—Sheet 2.

Witnesses,
Carl Schlegel.
L. A. Minturn

Inventor,
Walter A. Nordyke,
By Joseph A. Minturn
Attorney.

UNITED STATES PATENT OFFICE.

WALTER A. NORDYKE, OF INDIANAPOLIS, INDIANA.

EXTENSION-BRACKET.

SPECIFICATION forming part of Letters Patent No. 637,969, dated November 28, 1899.

Application filed October 26, 1898. Serial No. 694,594. (No model.)

*To all whom it may concern:*

Be it known that I, WALTER A. NORDYKE, a citizen of the United States, residing at Indianapolis, in the county of Marion and State of Indiana, have invented certain new and useful Improvements in Extension-Brackets, of which the following is a specification.

This invention relates to improvements in brackets for supporting telephone, electric-light, and other wire cables, and is especially adapted for use in manholes required for the proper construction and maintenance of underground or conduit systems of wiring; but inasmuch as extensible brackets, such as are contemplated by this invention, are applicable to other purposes it is not desired to limit their use to the supporting of wire cables.

The object of the invention is to provide means for the attachment of the brackets after the walls of the manhole are completed, in order that they may not be in the way of the workmen until they are required for use, and the further object is to provide a bracket in a plurality of removable sections, which may be added to increase the length of the arm from time to time as needed. These objects are accomplished by the mechanism illustrated in the accompanying drawings, in which—

Figure 7:
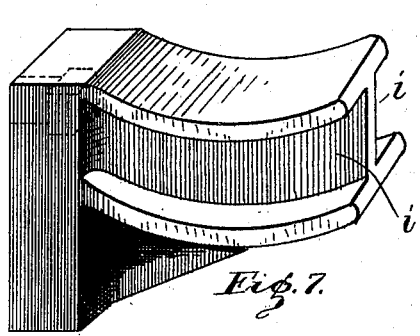
Figure 8:
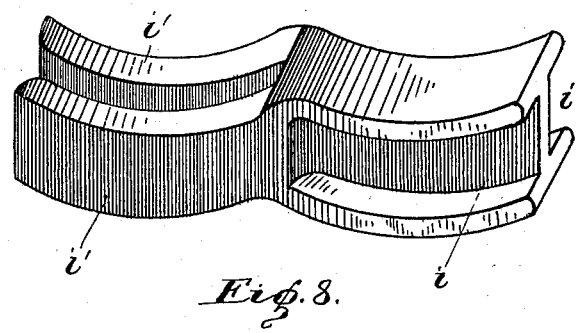
Figures 9, 10:
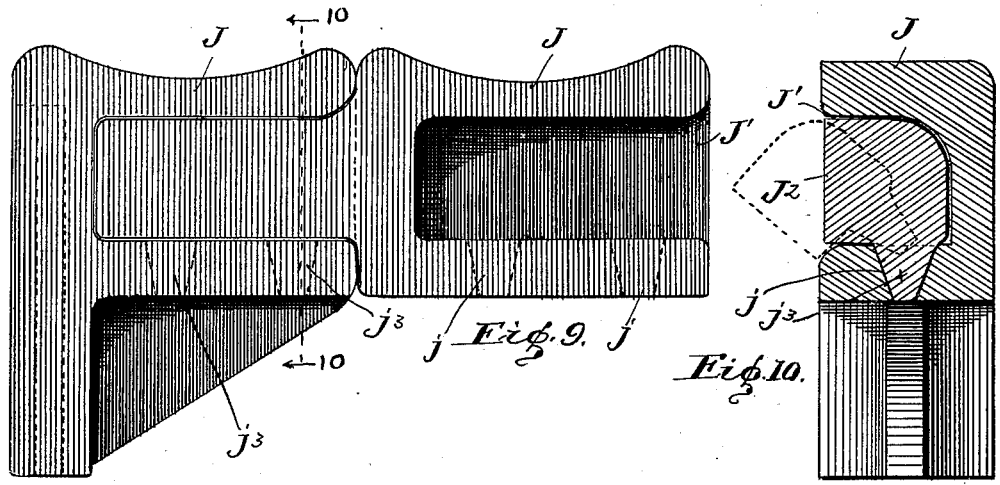
Figure 11:
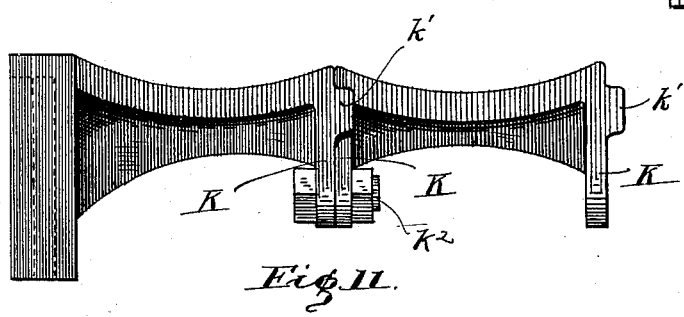

Figure 1 is a vertical section through a manhole, showing cables supported by brackets made in accordance with this invention; Fig. 2, a detail in perspective of a wooden post to which the bracket is fastened and showing the first and second sections of the improved jointed bracket in operative position in full lines and a third section in dotted lines; Fig. 3, a perspective view of a single one of the removable sections of the bracket-arm; Fig. 4, an under side view of the first section or section adjacent to the supporting-post; Fig. 5, a detail showing the manner in which the post is anchored to the walls of the manhole; Fig. 6, a view in side elevation of a modified form of extensible bracket; Figs. 7 and 8, perspective views of the first and second sections, respectively, of another modified construction; Fig 9, a view in side elevation of a third modified form of bracket; Fig. 10, a vertical section on the line 10 10 of Fig. 9, and Fig. 11 is a side elevation of a bracket in which the sections are bolted together.

Similar letters of reference indicate like parts throughout the several views of the drawings.

A represents the walls of a manhole of usual construction, and B the tile conduits of usual construction leading in from the streets in the usual way, and C are the cables, for the support of which within the manhole the bracket forming the subject of this invention is intended.

D are wooden posts which are retained in vertical position against the wall by bolts $d$, which are inserted as the wall is laid, and have outside heads $d'$ to prevent their withdrawal.

E are lag-screws upon which the brackets are hung and which may be inserted before the posts are set or afterward, as needed for use.

F represents the first section of my improved bracket, which differs from the remaining sections in that it is provided with means for removably securing it to the lag-screw from which it is to be supported. The face designed to contact with the post is slotted from the bottom vertically, but only part way of its length. The bracket-section is inserted with the head of the lag-screw in the slot and its withdrawal except by a vertical upward movement is prevented by the inwardly-projecting marginal flanges $ff$. Extending from this expanded body-portion F' of the bracket-section on the side opposite the slot is the arm $F^2$, of suitable length and sufficiently dished to make a good seat for the cable. The arm is sufficiently wide to make a good bearing for the cable and to decrease the weight and cost will preferably be much thinner than the width, as shown in the drawings, and will be strengthened by the under side web $f^3$. The outer end of the arm will have the two lateral oppositely-projected pins $f^7$, from which the next adjacent section of the bracket will be suspended.

As all of the remaining sections will be alike a description of one will suffice for all. This second section is represented at G.

G' is the body part, having the bifurcated extensions $g\ g$, with hooked terminals to engage the pins on the adjacent section of the bracket F in the manner as shown in Fig. 2, and extending from below the hooks g g is the diagonal brace g', which is integral with the body G' and abuts on the body of the section F. The body G' has the arm G², similar to the arm F², with the same under side web g² and pins g⁷. The lower end of the body G' in each bracket-section extends down to afford a bearing for a diagonal brace next outside of it.

In the modification shown in Fig. 6 the outer or forward end of the arm is provided with the under side extension H', having an end socket h and a slot h' between the socket and arm. Extending in a diagonally-downward direction from the other end is the bar h³, corresponding somewhat in construction and bility of ammonia alum which is formed when the aluminium sulphate is added to the chlo- function with the diagonal brace g' of the bracket already described, except that it serves the double purpose of a means of attachment in place of the hooks and of a brace.

The manner of putting together is shown in the drawings.

In the modifications shown in Figs. 7 and 8 the section to which an attachment is made has opposite side grooves i i, which follow the arc of a circle and into which a pair of similarly-curved tongues i' i' of the section to be attached are inserted for the purpose of preventing the accidental dismemberment of the bracket.

In the modification shown in Figs. 9 and 10 the body J on which the cable rests, has the deep groove J', on one side, with inside sockets j j. Into this groove the tongue J² from the adjacent section to be fastened to it is inserted by a half-turn, which is made necessary by the pins or lugs j³ j³ projecting down from the lower edge of the tongue. The upper corner of the tongue and the inside edge of the lower wall of the groove are rounded to permit of this rolling action for inserting the tongue.

In the modification shown in Fig. 11 the ends of the sections to be joined have vertical flanges K, with registering transverse openings through which bolts k² are inserted, whereby the sections are bolted together. k' are lugs to keep the sections from rotating on the bolts.

In all of the above-described forms the weight of the cable when once in position on the bracket will be sufficient to prevent the accidental displacement of the latter or of any of its sections.

Having thus fully described my invention, what I claim as new, and wish to secure by Letters Patent of the United States, is—

1. A bracket in a plurality of parts and means for removably but rigidly securing the parts together in series whereby the length of the bracket can be varied without permitting of downward or lateral movement of the parts, substantially as described.

2. A bracket in a plurality of separable parts said bracket being removably secured to a support, but not adjustable laterally and said parts being separable to vary the length of the bracket by the removal or addition of one or more of said parts but not adjustable laterally, the fastenings for connecting the parts being integral portions of the parts to be joined, substantially as described.

3. A bracket for supporting underground cables and the like comprising a first section with means for removably securing it to a fixed support, and additional sections and all of said sections having interlocking hooks which require the outer ends of the sections to be raised to attach and detach them but not turning in a horizontal plane, substantially as described and specified.

4. In a bracket for the purposes described, a first or initial section removably attached to a fixed support, additional separate sections and fastening means consisting of parts integral with one section to interlock with counterparts integral with the section to be attached to it whereby all of the parts or sections are attached to the first, substantially as set forth.

5. A bracket for supporting underground cables and the like comprising a first section with means for removably securing it to a fixed support, and additional sections secured to the first, all of said sections having interlocking portions integral with the sections, which permit of neither downward nor lateral movement of said sections in either direction, for removably securing the additional sections to the first or initial section to vary the length of the bracket, substantially in the manner as described and specified.

In witness whereof I have hereunto set my hand and seal, at Indianapolis, Indiana, this 18th day of October, A. D. 1898.

WALTER A. NORDYKE. [L. S.]

Witnesses:
J. A. MINTURN,
CARL SCHLEGEL.